United States Patent
Chen et al.

(10) Patent No.: US 11,889,099 B2
(45) Date of Patent: Jan. 30, 2024

(54) METHODS AND APPARATUSES OF VIDEO PROCESSING FOR BI-DIRECTIONAL PREDICTION WITH MOTION REFINEMENT IN VIDEO CODING SYSTEMS

(71) Applicant: MEDIATEK INC., Hsinchu (TW)

(72) Inventors: Ching-Yeh Chen, Hsinchu (TW); Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 310 days.

(21) Appl. No.: 17/435,440

(22) PCT Filed: Mar. 2, 2020

(86) PCT No.: PCT/CN2020/077430
§ 371 (c)(1),
(2) Date: Sep. 1, 2021

(87) PCT Pub. No.: WO2020/177665
PCT Pub. Date: Sep. 10, 2020

(65) Prior Publication Data
US 2022/0060735 A1  Feb. 24, 2022

Related U.S. Application Data

(60) Provisional application No. 62/813,806, filed on Mar. 5, 2019.

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/132* (2014.11); *H04N 19/159* (2014.11); *H04N 19/176* (2014.11)

(58) Field of Classification Search
CPC .. H04N 19/513; H04N 19/105; H04N 19/132; H04N 19/159; H04N 19/176;
(Continued)

(56) References Cited

U.S. PATENT DOCUMENTS 10,182,240 B2   1/2019  Hsu
10,349,079 B2   7/2019  Lin et al.
(Continued)

FOREIGN PATENT DOCUMENTS

CN   107113424 A   8/2017
CN   104661031 B   12/2017
(Continued)

OTHER PUBLICATIONS

International Search Report and Written Opinion dated Apr. 26, 2020, issued in application No. PCT/CN2020/077430.
(Continued)

*Primary Examiner* — Tung T Vo
(74) *Attorney, Agent, or Firm* — McClure, Qualey & Rodack, LLP

(57) ABSTRACT

Exemplary video processing methods and apparatuses for encoding or decoding a current block by bi-directional prediction are disclosed. L0 and L1 reference blocks are determined for the current block, and a motion vector refinement is applied to refine the L0 and L1 reference blocks using a motion estimation search performed on each processing unit in the current block. A bi-directional optical flow operation is early terminated according to a cost of each processing unit in the current block. The processing units for cost calculation in the motion vector refinement and the bi-directional optical flow early termination are unified. The bi-directional optical flow operation is applied to the current block to further refine the L0 and L1 reference blocks if the bi-directional optical flow operation is not early terminated.

(Continued)

A final inter predictor is derived from the refined L0 and L1 reference blocks for encoding or decoding the current block.

9 Claims, 12 Drawing Sheets

(51) Int. Cl.
    *H04N 19/132*     (2014.01)
    *H04N 19/159*     (2014.01)
    *H04N 19/176*     (2014.01)

(58) Field of Classification Search
    CPC ...... H04N 19/61; H04N 19/523; H04N 19/56; H04N 19/577
    USPC .................................................... 375/240.12
    See application file for complete search history.

(56) References Cited

U.S. PATENT DOCUMENTS

| | | |
|---|---|---|
| 2014/0355666 A1 | 12/2014 | Zhang et al. |
| 2018/0249172 A1 | 8/2018 | Chen et al. |
| 2021/0266595 A1* | 8/2021 | Su .................. H04N 19/105 |
| 2022/0150507 A1* | 5/2022 | Lin .................. H04N 19/57 |
| 2022/0417521 A1* | 12/2022 | Zhang .............. H04N 19/52 |

FOREIGN PATENT DOCUMENTS

| | | |
|---|---|---|
| CN | 107925775 A | 4/2018 |
| TW | 201902223 A | 1/2019 |
| WO | 2018/049043 A1 | 3/2018 |
| WO | 2018/113658 A1 | 6/2018 |
| WO | 2018/166357 A1 | 9/2018 |

OTHER PUBLICATIONS

Chinese language Notice of Allowance dated Jul. 20, 2021, issued in application No. TW 109106883.

* cited by examiner

METHODS AND APPARATUSES OF VIDEO PROCESSING FOR BI-DIRECTIONAL PREDICTION WITH MOTION REFINEMENT IN VIDEO CODING SYSTEMS

CROSS REFERENCE TO RELATED APPLICATION

The present invention claims priority to U.S. Provisional Patent Application, Ser. No. 62/813,806, filed on Mar. 5, 2019, entitled "Alignment of DMVR and BDOF process". The U.S. Provisional Patent Application is hereby incorporated by reference in its entirety.

FIELD OF THE INVENTION

The present invention relates to video processing methods and apparatuses in video encoding and decoding systems. In particular, the present invention relates to encode or decode video data by bi-directional prediction in inter picture prediction.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard improves the video compression performance of its proceeding standard H.264/AVC to meet the demand for higher picture resolutions, higher frame rates, and better video qualities.

Skip and Merge Skip and Merge modes increase the coding efficiency of Motion Vector (MV) in the HEVC standard as motion information is inherited from spatially neighboring blocks or a temporally collocated block. To code a block in Skip or Merge mode, instead of signaling motion information, only a Merge index representing a final Merge candidate selected from a candidate set is signaled. The motion information reused by the block coded in Skip or Merge mode includes a MV, prediction direction, and reference picture index of the selected final candidate. It is noted that if the selected final candidate is a temporal motion candidate, the reference picture index is always set to zero. Prediction residual is coded when the block is coded in Merge mode, however, the Skip mode further skips signaling of the prediction residual as the residual data of a block coded in Skip mode is forced to be zero.

FIG. 1 illustrates a Merge candidate set constructed for a current Prediction Unit (PU) 10 coded in Skip or Merge mode in the HEVC standard. The Merge candidate set consists of four spatial motion candidates associated with neighboring blocks of the current PU 10 and one temporal motion candidate associated with a collocated PU 12 of the current PU 10. As shown in FIG. 1, the first Merge candidate is a left predictor $A_1$ 112, the second Merge candidate is a top predictor $B_1$ 114, the third Merge candidate is a right above predictor $B_0$ 113, and a fourth Merge candidate is a left below predictor $A_0$ 111. A left above predictor $B_2$ 115 is included in the Merge candidate set to replace an unavailable spatial predictor. A fifth Merge candidate is a temporal predictor of first available temporal predictors $T_{BR}$ 121 and $T_{CTR}$ 122. The encoder selects one final candidate from the candidate set for each PU coded in Skip or Merge mode based on motion vector compensation such as through a Rate-Distortion Optimization (RDO) decision, and an index representing the selected final candidate is signaled to the decoder. The decoder selects the same final candidate from the candidate set according to the index transmitted in the video bitstream. Since the derivations of Skip and Merge candidates are similar, the "Merge" mode referred hereafter may correspond to Merge mode as well as Skip mode for convenience.

Decoder MV Refinement (DMVR) Bilateral template MV refinement, also referred to as Decoder MV Refinement (DMVR), is applied in the Merge mode to improve the coding efficiency of the HEVC standard. DMVR works in both encoder and decoder sides and it is only applied to bi-directional prediction. The main concept of bilateral template MV refinement is to refine the MV by a motion estimation search in the Merge mode as shown in FIG. 2. For a Merge candidate having bi-prediction MVs, including a List 0 (L0) MV 242 and a List 1 (L1) MV 262, steps of bilateral template MV refinement are described in the following. In a first step of DMVR, a L0 reference block 244 pointed by the L0 MV 242 is located and a L1 reference block 264 pointed by the L1 MV 262 is located. In a second step of DMVR, a bilateral template 22 is generated by information of the L0 reference block 244 and L1 reference block 264, for example, the bilateral template 22 is calculated as an average of the L0 reference block 244 and L1 reference block 264. In a third step, the bilateral template 22 is used to perform integer motion estimation and fractional motion estimation searches around the L0 reference block 244 in a L0 reference picture 24 with a search range of P pixels×Q pixels to find a location with a minimum motion estimation cost. An embodiment of the motion estimation cost is a Sum of Absolute Difference (SAD). The final location of the minimum motion estimation cost is assigned to a refined MV of L0 246. In the third step, the bilateral template 22 is also used to perform integer motion estimation and fractional motion estimation searches around the L1 reference block 264 in a L1 reference picture 26 with a search range of P pixels×Q pixels to find a location of a minimum motion estimation cost. The final location of the minimum motion estimation cost is assigned to a refined MV of L1 266. In a fourth step, a L0 refined block 248 pointed by the refined MV of L0 246 and a L1 refined block 268 pointed by the refined MV of L1 266 are final reference blocks for a later stage, for example, these two final reference blocks 248 and 268 are used for motion compensation.

Pattern-based MV Derivation (PMVD) A Pattern-based MV Derivation (PMVD) method, also referred to as FRUC (Frame Rate Up Conversion), is a coding tool which consists of bilateral matching for bi-prediction blocks and template matching for uni-prediction blocks. A flag FRUC_mrg_flag is signaled when Merge or Skip flag is true, and if FRUC_mrg_flag is true, a FRUC_merge_mode is signaled to indicate whether the bilateral matching Merge mode as shown in FIG. 3 or template matching Merge mode as shown in FIG. 4 is selected. In the pattern-based MV derivation method, a new Motion Vector Predictor (MVP) called temporal derived MVP is derived by scanning all MVs in all reference pictures. For example, in order to derive a L0 temporal derived MVP, each L0 MV in L0 reference pictures is scaled to point to the current picture. The 4×4 block that pointed by this scaled MV in the current picture is a target current block. The MV is further scaled to point to a reference picture with a reference index equals to 0 in L0 for the target current block. The further scaled MV is stored in a L0 MV field for the target current block. FIG. 5 shows an example of deriving temporal derived MVPs. MVs in all 4×4 blocks in all reference pictures are scanned to generate temporal derived L0 and L1 MVPs of the current picture.

For each MV, the MV is scaled to get a crossed block in the current picture, and then the scaled MVP is calculated and assigned to the crossed block.

Both bilateral matching Merge mode and template matching Merge mode consist of two-stage matching: the first stage is Prediction Unit level (PU-level) matching, and the second stage is sub-PU-level matching. In the PU-level matching, multiple initial MVs in L0 and L1 are selected respectively. These MVs includes MVs from Merge candidates (i.e., conventional Merge candidates such as these specified in the HEVC standard) and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The Sum of Absolutely Differences (SAD) of these two blocks is calculated. The MV pair with the smallest SAD is selected as the best MV pair. A diamond search is then performed to refine the MV pair. The refinement precision is ⅛-pel. The refinement search range is restricted within ±8 pixel. The final MV pair is the PU-level derived MV pair.

The sub-PU-level searching in the second stage searches a best MV pair for each sub-PU. The current PU is divided into sub-PUs, where the depth of sub-PU (e.g. 3) is signaled in Sequence Parameter Set (SPS) with a minimum sub-PU size of 4×4 samples. Several starting MVs in List 0 and List 1 are selected for each sub-PU, which includes PU-level derived MV pair, zero MV, HEVC collocated TMVP of the current sub-PU and bottom-right block, temporal derived MVP of the current sub-PU, and MVs of left and above PUs or sub-PUs. By using the similar mechanism in PU-level searching, the best MV pair for each sub-PU is selected. The diamond search is then performed to refine the best MV pair. Motion compensation for each sub-PU is then performed to generate a predictor for each sub-PU.

For the bilateral matching merge mode as shown in FIG. 3, motion information for a current block 310 in a current picture is derived based on two reference pictures Ref 0 and Ref 1. Bilateral matching is applied when the motion vectors derived from Merge mode are bi-prediction pointing to two reference pictures with an equal distance from the current picture (i.e. temporal distances TD0=TD1). The motion information of the current block 310 is derived by searching the best match between two blocks 320 and 330 along the motion trajectory 340 of the current block in two different reference pictures Ref 0 and Ref 1. Under the assumption of continuous motion trajectory, the motion vectors MV0 associated with Ref 0 and MV1 associated with Ref 1 pointing to the two reference blocks shall be proportional to the temporal distances TD0 and TD1, between the current picture and the two reference pictures Ref 0 and Ref 1.

FIG. 4 illustrates an example of the template matching Merge mode. The reconstructed pixels of above four rows and left four columns of a current block are used to form a template, for example, the two neighboring areas 420a and 420b of the current block 410 in a current picture are used as the template. Template matching is performed to find the best matched template with its corresponding MV, for example, the best matched template 430a and 430b in a reference picture Ref 0 are found with its corresponding motion vector 440. In the PU-level matching of the two-stage matching, several starting MVs in List 0 and List 1 such as MVs from Merge candidates and MVs from temporal derived MVPs are selected. Two different starting MV sets are generated for two lists. For each MV in one list, the SAD cost of the template with the MV is calculated. The MV with the smallest SAD cost is the best MV. The diamond search is then performed to refine the best MV with a refinement precision of ⅛-pel, and restricted the refinement search range to be within ±8 pixel. The final MV is the PU-level derived MV. The MVs in List 0 and List 1 are generated independently. For the sub-PU-level searching, the current PU is divided into sub-PUs. For each sub-PU at left or top PU boundaries, several starting MVs in List 0 and List 1 are selected, and by using similar mechanism in PU-level searching, the best MV pair for each sub-PU at left or top PU boundaries is selected. The diamond search is performed to refine the MV pair. Motion compensation is performed to generate a predictor for each sub-PU according to the refined MV pair. For those PUs which are not at left or top PU boundaries, the sub-PU-level searching is not applied, and the corresponding MVs are set equal to the MVs in the first stage. While the List 0 reference picture (Ref 0) is shown in FIG. 4, the List 1 reference picture (Ref 1) can also be used as a reference picture for template matching search.

In this decoder MV derivation method, template matching is also used to generate a MVP for Advanced Motion Vector Prediction (AMVP) mode coding. Template matching is performed to find a best template on a selected reference picture, and its corresponding MV is the derived MVP. This derived MVP is then inserted into a first position in an AMVP candidate set.

PMVD is not restricted to the above descriptions, any inter mode tool using pattern-based refinement of the PMVD behavior can also be denoted as PMVD or FRUC mode. One embodiment of PMVD mode signals a PMVD Merge index to the decoder to indicate which Merge candidate is selected for MV refinement, whereas in other embodiments, the decoder tries all Merge candidates to find a best starting MV. In one embodiment, steps for sub-PU refinement are skipped for template matching in the PMVD coding tool, however, sub-PU refinement is performed for bilateral matching in the PMVD coding tool. In another embodiment of PMVD mode, sub-PU refinement is also not performed for bilateral matching, that is there is only the first stage of PU-level matching is performed for both bilateral and template matching in the PMVD coding tool.

Bilateral based DMVR An implementation of DMVR replaces bilateral template generation with a bilateral matching method based on the PMVD bilateral matching mode. An example of bilateral based DMVR is described in document JVET-K0217, proposed in the 11$^{th}$ Meeting of Joint Video Experts Team (JVET) of ITU-T SG 16 WP3 and ISO/IEC JTC 1/SC 29/WG 11 in Ljubljana, SI, at 10-18 Jul. 2018. In another document JVET-M0029, bilateral based DMVR is further simplified to reduce the required computation complexity. One simplification uses block-based refinement instead of CU-based refinement. A CU with a size equal to M×N samples is partitioned into several units with a size equal to min (M, 16)×min (N, 16), where min (x, y) represents a minimum value between x and y. Each unit in the CU is refined independently and the refinement search range to be within ±1 pixel.

Bi-Directional Optical Flow (BDOF) Bi-Directional Optical Flow (BDOF) achieves sample-level refinement through the assumptions of optical flow and steady motion of objects. BDOF is only applied to truly bi-directional predicted blocks, where the truly bi-directional predicted blocks are blocks in a current picture predicted from two reference pictures, one reference picture is a previous picture and the other reference picture is a latter picture. A predictor of a bi-directional predicted block is derived by blending one List 0 predictor retrieved from a reference picture of List 0 and one List 1 predictor retrieved from a reference picture of List 1. FIG. 6 illustrates an example of applying BDOF to refine one particular sample in a bi-directional predicted block in a bi-direction slice (B-slice), where this sample is predicted by corresponding pixels in two reference pictures, Reference 0 and Reference 1. BDOF employs a 5×5 window to derive the refinement for each sample, so for each N×N block, the motion compensated results and corresponding gradient information of a (N+4)×(N+4) block are required for deriving the sample-based refinement. In BDOF, a 6-Tap gradient filter and a 6-Tap interpolation filter are used to generate the gradient information. The computational complexity of BDOF is much higher than that of the traditional bi-directional prediction.

In the traditional bi-directional prediction supported by the HEVC standard, the inter predictor is generated according to the formula shown in Equation 1, in which $P^{(0)}$ and $P^{(1)}$ are corresponding List 0 and List 1 predictors respectively.

$$P_{Conventional}[i,j]=(P^{(0)}[i,j]+P^{(1)}[i,j]+1)>>1 \quad \text{Equation 1}$$

The inter predictor generated by BDOF is shown in Equation 2, where $I_x^{(0)}$ and $I_x^{(1)}$ represent a x-directional gradient in List 0 and List 1 predictors, respectively, and $I_y^{(0)}$ and $I_y^{(1)}$ represent a y-directional gradient in List 0 and List 1 predictors, respectively. The offsets in x-direction and y-direction are $v_x$ and $v_y$, respectively, and these offsets are used to refine the samples of the inter predictors as shown in FIG. 6.

$$P_{OpticalFlow}=(P^{(0)}[i,j]+P^{(1)}[i,j]++v_x[i,j](I_x^{(0)}-I_x^{(1)}[i,j])++v_y[i,j](I_y^{(0)}=I_y^{(1)}[i,j])+1)>>1. \quad \text{Equation 2}$$

The x-directional and y-directional gradients can be directly derived based on interpolated results or these gradients can be calculated using another set of gradient filters and interpolation filters. One additional shift, called gradient shift, is also introduced to normalize the gradient values in the derivation process of each gradient. The derivation process of the offsets $v_x$ and $v_y$ is shown in the following. First, a cost function diffCost(x, y) is defined to search for the best values for the offsets $v_x$ and $v_y$. The best values of the offsets $v_x$ and $v_y$ minimize the cost function diffCost(x, y) as shown in Equation 3, and one 5×5 window is used to derive the refinement. The solutions of the offsets $v_x$ and $v_y$ can be represented by using parameters $S_1$, $S_2$, $S_3$, $S_5$, and $S_6$ as shown in Equation 4.

$$diffCost(x,y) = \sum_\Omega \left( P^0(x,y) + v_x \frac{\partial P^0(x,y)}{\partial x} + v_y \left(\frac{\partial P^0(x,y)}{\partial y}\right) - \left(P^1(x,y) - v_x \frac{\partial P^1(x,y)}{\partial x} - v_y \frac{\partial P^1(x,y)}{\partial y}\right)\right)^2$$

$$= \sum_\Omega \left(P^0(x,y) - P^1(x,y) + v_x\left(\frac{\partial P^0(x,y)}{\partial x} + \frac{\partial P^1(x,y)}{\partial x}\right) + v_y\left(\frac{\partial P^0(x,y)}{\partial y} + \frac{\partial P^1(x,y)}{\partial y}\right)\right)^2$$

$$\min diffCost(x,y) \Rightarrow \frac{\partial diffCost(x,y)}{\partial v_x}=0, \frac{\partial diffCost(x,y)}{\partial v_y}=0$$

$$=> v_x = \frac{S_3 S_5 - S_2 S_6}{S_1 S_5 - S_2 S_2}, v_y = \frac{S_1 S_6 - S_3 S_2}{S_1 S_5 - S_2 S_2}$$

where $$S_1 = \sum_\Omega \left(\frac{\partial P^0(x,y)}{\partial x} + \frac{\partial P^1(x,y)}{\partial x}\right)^2, \quad \text{Equation 4}$$

$$S_2 = \sum_\Omega \left(\frac{\partial P^0(x,y)}{\partial x} + \frac{\partial P^1(x,y)}{\partial x}\right)\left(\frac{\partial P^0(x,y)}{\partial y} + \frac{\partial P^1(x,y)}{\partial y}\right)$$

$$S_3 = -\sum_\Omega \left(\frac{\partial P^0(x,y)}{\partial x} + \frac{\partial P^1(x,y)}{\partial x}\right)(P^0(x,y) - P^1(x,y)),$$

$$S_5 = \sum_\Omega \left(\frac{\partial P^0(x,y)}{\partial y} + \frac{\partial P^1(x,y)}{\partial y}\right)^2$$

$$S_6 = -\sum_\Omega \left(\frac{\partial P^0(x,y)}{\partial y} + \frac{\partial P^1(x,y)}{\partial y}\right)(P^0(x,y) - P^1(x,y))$$

The formulas for calculating the offsets $V_x$ and $V_y$ can be further simplified according to Equation 5.

$$=> v_x = \frac{S_3}{S_1}, v_y = \frac{S_{6-V_x}S_2}{S_5} \quad \text{Equation 5}$$

where $$S_1 = \sum_\Omega \left(\frac{\partial P^0(x,y)}{\partial x} + \frac{\partial P^1(x,y)}{\partial x}\right)^2,$$

$$S_2 = \sum_\Omega \left(\frac{\partial P^0(x,y)}{\partial x} + \frac{\partial P^1(x,y)}{\partial x}\right)\left(\frac{\partial P^0(x,y)}{\partial y} + \frac{\partial P^1(x,y)}{\partial y}\right)$$

$$S_3 = -\sum_\Omega \left(\frac{\partial P^0(x,y)}{\partial x} + \frac{\partial P^1(x,y)}{\partial x}\right)(P^0(x,y) - P^1(x,y)),$$

$$S_5 = \sum_\Omega \left(\frac{\partial P^0(x,y)}{\partial y} + \frac{\partial P^1(x,y)}{\partial y}\right)^2$$

$$S_6 = -\sum_\Omega \left(\frac{\partial P^0(x,y)}{\partial y} + \frac{\partial P^1(x,y)}{\partial y}\right)(P^0(x,y) - P^1(x,y))$$

In the block-based BDOF operation, the derived offsets $V_x$ and $V_y$ are shared for all samples in one block and the size of each block is 4×4 samples. In order to reduce the computational complexity of the BDOF operation, two early termination processes are employed. A Sum of Absolute Differences (SAD) between two predictors of a CU is first calculated, one predictor is from L0 and another predictor is from L1, and if the SAD between the two predictors is smaller than one threshold, the BDOF operation is skipped as the two predictors are good enough. Otherwise, the BDOF operation is applied to the CU. When the BDOF operation is applied to a current CU, the BDOF operation is selectively applied to each 4×4 block according to a SAD between two predictors of each 4×4 block. The BDOF operation is skipped when a SAD between two predictors in a current 4×4 block is smaller than a threshold.

BRIEF SUMMARY OF THE INVENTION

Exemplary methods of video processing in a video coding system perform bi-directional motion compensation to encode or decode video blocks. An exemplary video processing method receives input video data associated with a current block in a current picture, and determines a List 0 reference block for the current block by performing motion compensation from a reference picture in List 0 and a List 1 reference block for the current block by performing motion compensation from a reference picture in List 1. The List 0 and List 1 reference blocks are refined by a motion vector refinement using a motion estimation search to find a location corresponding to a minimum motion estimation cost around the List 0 and List 1 reference blocks. Cost calculation in the motion estimation search is performed on each processing unit in the current block. For example, a width of each processing unit is equal to a minimum of a current block width and 16, and a height of each processing unit is equal to a minimum of a current block height and 16. The exemplary video processing method further determines if a BDOF operation is early terminated according to a cost of the refined List 0 and List 1 reference blocks of each processing unit in the current block. The processing unit for cost calculation in BDOF early termination is aligned with the processing unit for cost calculation in the motion vector refinement. The BDOF operation is skipped or performed based on the cost. The BDOF operation further refine the refined List 0 and List 1 reference blocks by deriving BDOF parameters for sample-based refinement through optical flow. A final inter predictor for the current block is derived according to the refined List 0 and List 1 reference blocks for encoding or decoding the current block.

An example of the minimum motion estimation cost is calculated by a SAD, and an example of the cost for determining whether to early terminate the BDOF operation is also calculated by SAD. In one embodiment of the present invention, if the BDOF operation is not early terminated according to the cost of a processing unit, the exemplary video processing method further performs a second early termination process of BDOF on each 4×4 block in the processing unit. The second early termination process of BDOF determines whether to terminate the BDOF operation for each 4×4 block according to a cost between two predictors of each 4×4 block.

In an exemplary embodiment of the video processing method, subsampling is used in the motion vector refinement, but subsampling is not applied to cost calculation for determining whether to early terminate the BDOF operation. In this embodiment, costs calculated in the motion vector refinement may be multiplied by a factor and used to determine whether the BDOF operation is early terminated.

In another exemplary embodiment of the video processing method, subsampling is used in the motion vector refinement and the same subsampling is also applied to cost calculation for determining whether to early terminate the BDOF operation. In this embodiment, costs calculated in the motion vector refinement are directly reused to determine whether the BDOF operation is early terminated.

In some embodiments, costs calculated in the motion vector refinement are used to derive costs for determining whether the BDOF operation is early terminated according to a ratio, and the ratio is dependent on bit-depths of signals in cost functions in the motion vector refinement and the BDOF operation.

In some embodiments, the exemplary video processing method further comprises determining a motion vector difference before the motion vector refinement and after the motion vector refinement for the current block, and disables the BDOF operation for the current block according to the motion vector difference. In one embodiment, the BDOF operation is disabled for the current block if the motion vector difference is greater than a threshold. Some examples of the threshold is one predefined value, or explicitly signaled in a video bitstream at a sequence level, picture level, tile group level, tile level, or block level. In some embodiments, the threshold depends on one or a combination of a Coding Unit (CU) size, CU shape, search range, temporal distance between two reference pictures, Merge index, video resolution, and profile or level in one coding standard. The motion vector difference is calculated by one dimension or a sum of two dimensions. In another embodiment, the BDOF operation is disabled for the current block if the motion vector difference is smaller than a threshold.

In some embodiments, the motion estimation search includes an integer motion estimation search and a fractional motion estimation search, and the fractional motion estimation search may be adaptively disabled according to a motion vector difference before and after the motion refined by the integer motion estimation search. The fractional motion estimation search is disabled for the current block if the motion vector difference is greater than a threshold according to an embodiment. The threshold is a predefined value, or explicitly signaled in a video bitstream at a sequence level, picture level, tile group level, tile level, or block level. The threshold may depends on one or a combination of a CU size, CU shape, search range, temporal distance between two reference pictures, Merge index, video resolution, and profile or level in one coding standard. The motion vector different is calculated by either one dimension or a sum of two dimensions. The fractional motion estimation search is disabled for the current block if the motion vector different is smaller than a threshold according to another embodiment.

Aspects of the disclosure further provide embodiments of apparatuses for processing video data in a video coding system. An embodiment of the apparatuses comprises one or more electronic circuits configured for receiving input data of a current block in a current picture, determining a List 0 reference block and a List 1 reference block for the current block by performing motion compensation, performing a motion vector refinement and a BDOF operation to refine the List 0 and List 1 reference blocks, deriving a final inter predictor for encoding or decoding the current block according to the refined List 0 and List 1 reference blocks. Processing units for cost calculation or cost functions in the motion vector refinement and BDOF early termination are unified according to various embodiments, or costs of motion vector refinement are reused by BDOF early termination according to some embodiments.

Aspects of the disclosure further provide a non-transitory computer readable medium storing program instructions for causing a processing circuit of an apparatus to perform a video processing method to encode or decode a current block coded or to be coded in bi-directional prediction.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 12:
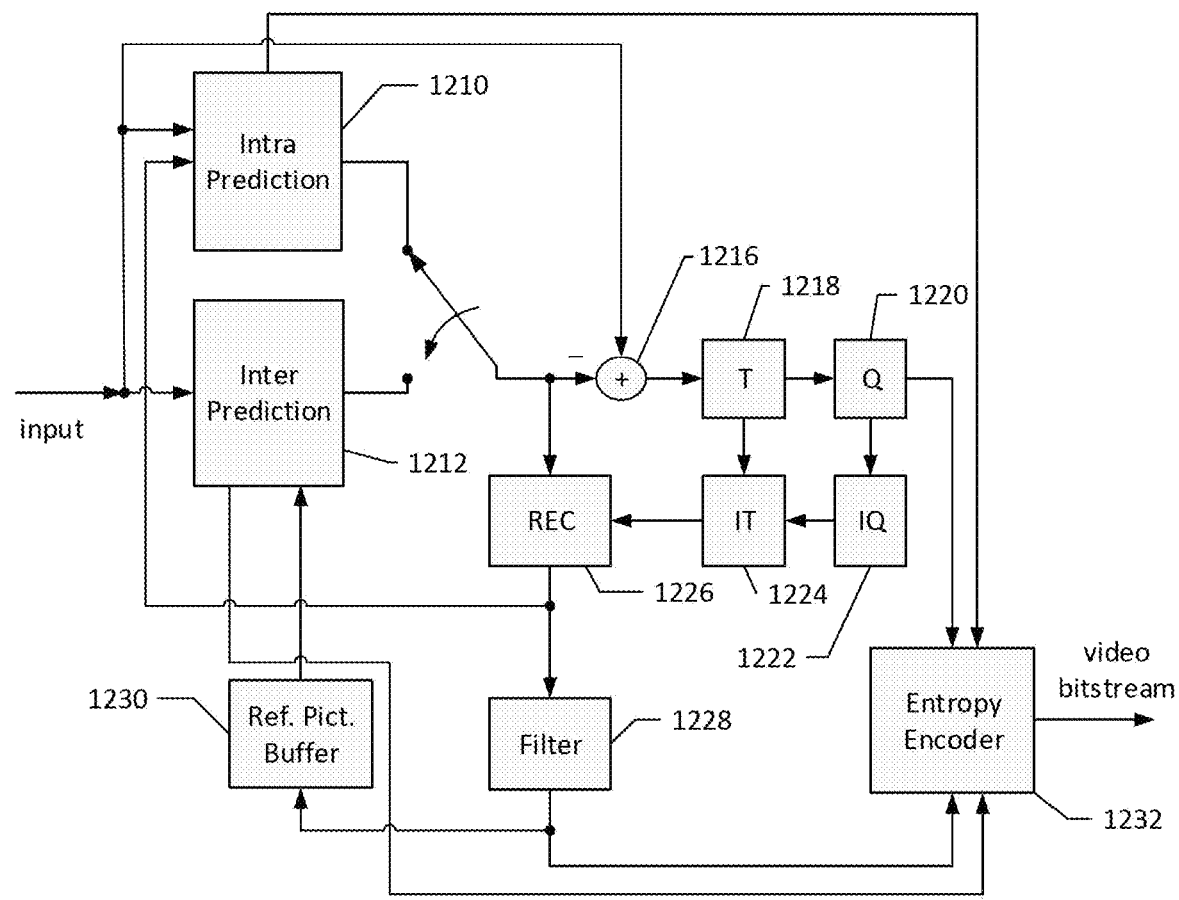
FIG. 12 illustrates an exemplary system block diagram for a video encoding system incorporating the video processing method according to embodiments of the present invention.
Figure 13:
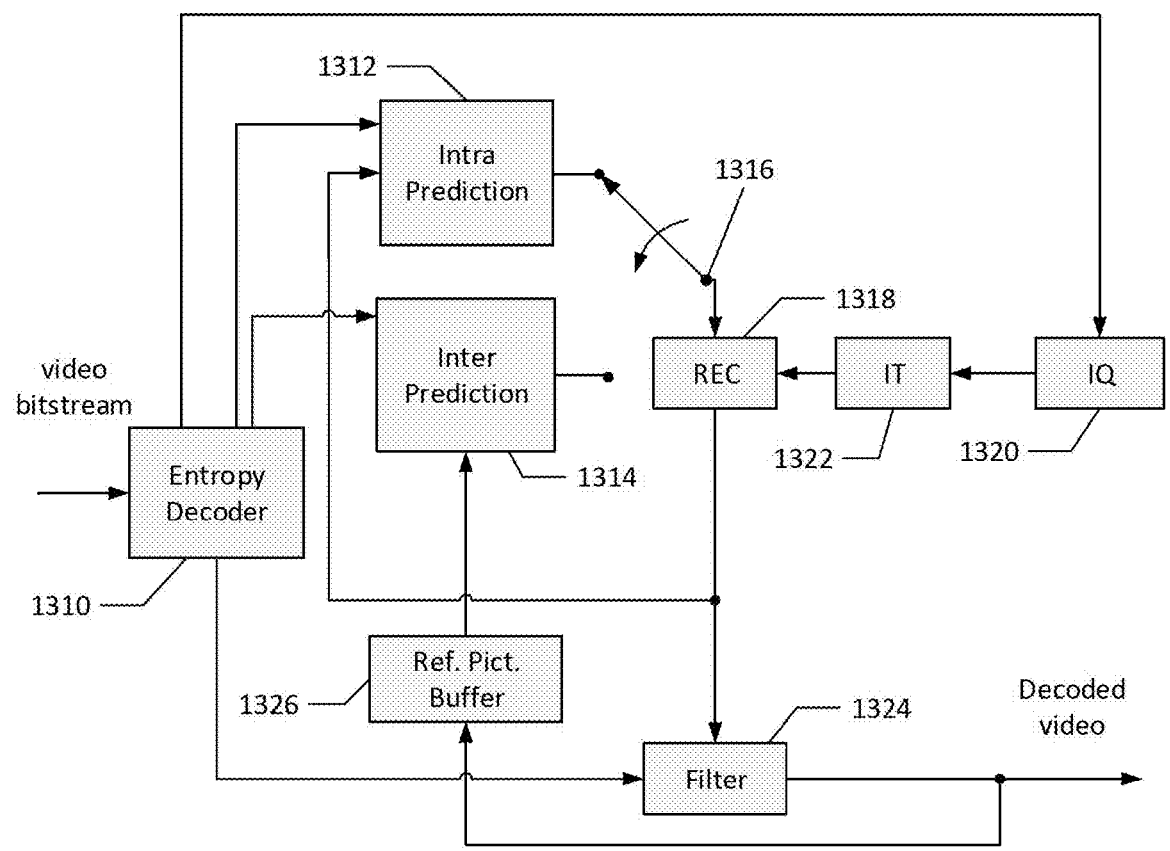
FIG. 13 illustrates an exemplary system block diagram for a video decoding system incorporating the video processing method according to embodiments of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. In this disclosure, systems and methods are described for processing bi-direction predicted block with motion refinement coding tools, where each or a combination of the methods may be implemented in a video encoder or video decoder. An exemplary video encoder and decoder implementing one or a combination of the methods are illustrated in FIGS. 12 and 13 respectively. Various embodiments in the disclosure reduce the computation complexity of implementing motion refinement coding tools. Systems and methods described herein are organized in sections as follows. The section "Align Processing Unit in DMVR and BDOF Early Termination" demonstrates exemplary methods of using the same processing unit size for cost calculation in DMVR and BDOF operations. The section "Unify Cost Function in DMVR and BDOF Early Termination" describes an exemplary embodiment of using the same cost function in DMVR and BDOF operations. The section "Reuse Cost of DMVR in BDOF Early Termination" describes an exemplary method of reusing cost calculated for DMVR in BDOF early termination. The sections "Disable BDOF Operation according to MV Difference Before and After Refinement" and "Disable Fractional Motion Refinement according to MV Difference Before and After Refinement" describe embodiments adaptively disable the BDOF operation or fractional motion estimation search in the DMVR operation according to the MV difference before and after DMVR refinement. The section "Representative Flowchart of Exemplary Embodiments" utilizes a flowchart to summarize steps for implementing some embodiments of the present invention the section "Video Encoder and Decoder Implementation" together with FIGS. 12 and 13 illustrate a video encoding system and a video decoding system incorporating one or a combination of the described video processing methods.

DMVR and BDOF can be enabled at the same time to improve the coding performance, and when both the DMVR and BDOF coding tools are enabled, DMVR is applied first to derive a final motion vector for each subblock followed by BDOF to refine final predictors. In order to reduce the computational complexity of bidirectional prediction employing the DMVR and BDOF coding tools, various video processing methods are presented in the following paragraphs.

Align Processing Unit in DMVR and BDOF Early Termination For a current Coding Unit (CU) with a size equal to M×N samples, the processing unit operated for cost calculation in the integer MV search stage of DMVR is a product of a minimum value between M and 16 and a minimum value between N and 16. For example, the processing unit operated in the integer MV search stage of DMVR is 16×16 samples when both width and height of a current CU are larger than or equal to 16 samples. The processing unit operated in the integer MV search stage of DMVR is 8×16 samples when the width of a current CU is 8 samples and the height of the current CU is equal to or larger than 16. Similarly, the processing unit is 16×8 samples when the width of a current CU is equal to or larger than 16 and the height of the current CU is 8 samples. The processing unit has the same size as a current CU if both width and height of the current CU are less than or equal to 16 samples. The processing unit for the two early termination processes of the conventional BDOF operation are one CU and one 4×4 block. In a first early termination process of BDOF, a cost between two predictors of a current CU is calculated, and the BDOF process for the current CU is terminated according to the calculated cost. In a second early termination process of BDOF, a cost between two predictors of a current 4×4 block is calculated, and the BDOF process for the current 4×4 block is terminated according to the cost between the two predictors of the current 4×4 block. For example, the cost is calculated by a Sum of Absolute Differences (SAD). In some embodiments of the present invention, the processing unit for calculating a cost in the first early termination process of BDOF is the same as the processing unit in DMVR. One embodiment further eliminates the second early termination process of BDOF applied on every 4×4 block as the maximum size of the processing unit in the first early termination of BDOF is 16×16 samples. In another embodiment, the second early termination process of BDOF is still applied to each 4×4 block in the current CU by calculating a cost between two predictors of each 4×4 block.

Figure 1:
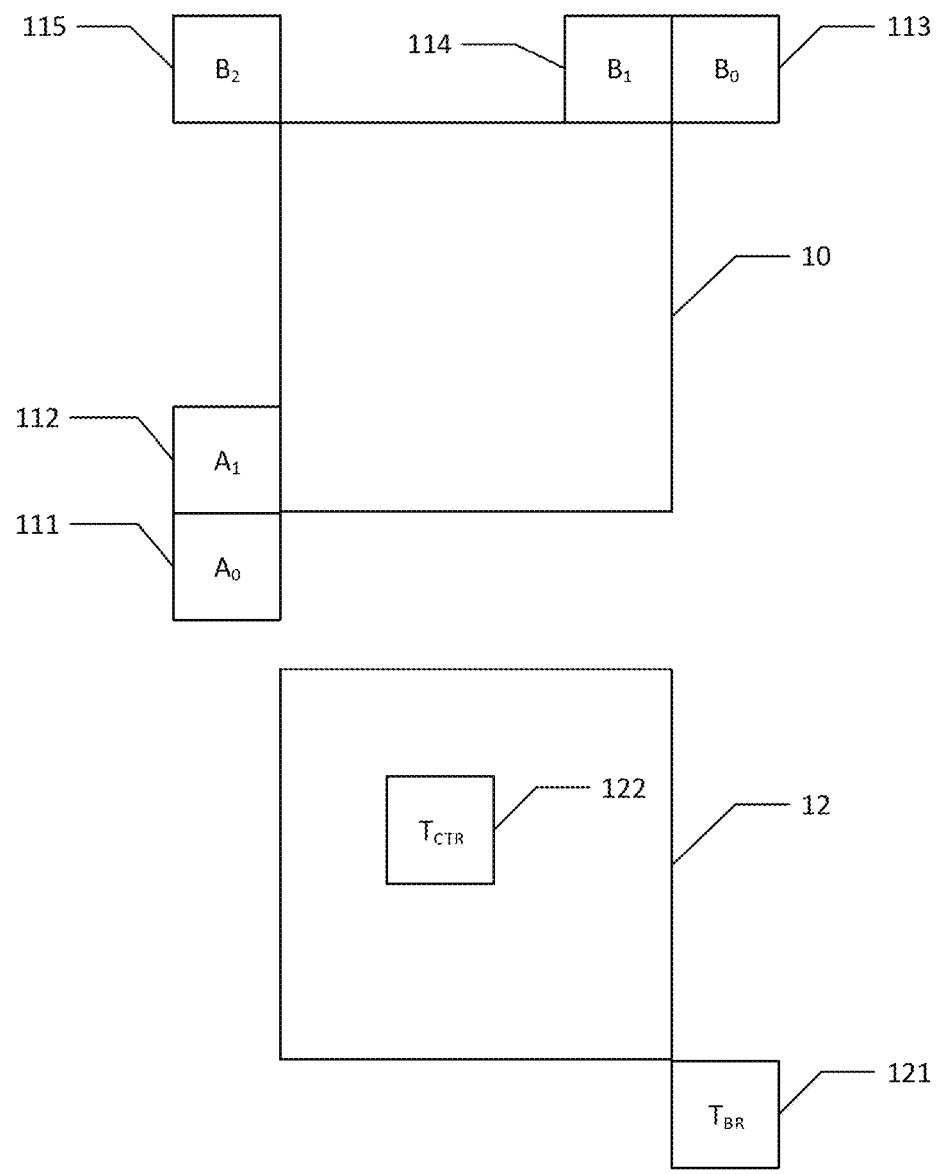
FIG. 1 illustrates locations of spatial motion candidates and temporal motion candidate for constructing a Merge candidate sets defined in the HEVC standard.
Figure 2:
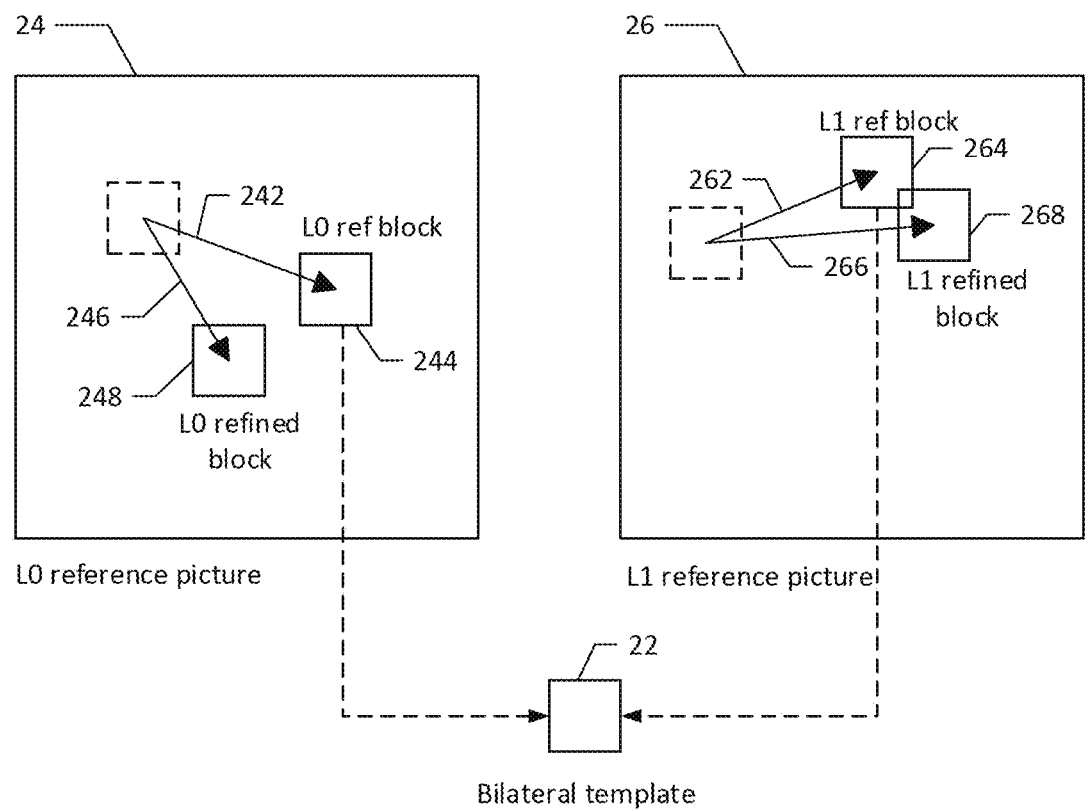
FIG. 2 illustrates the concept of bilateral template MV refinement.
Figure 3:
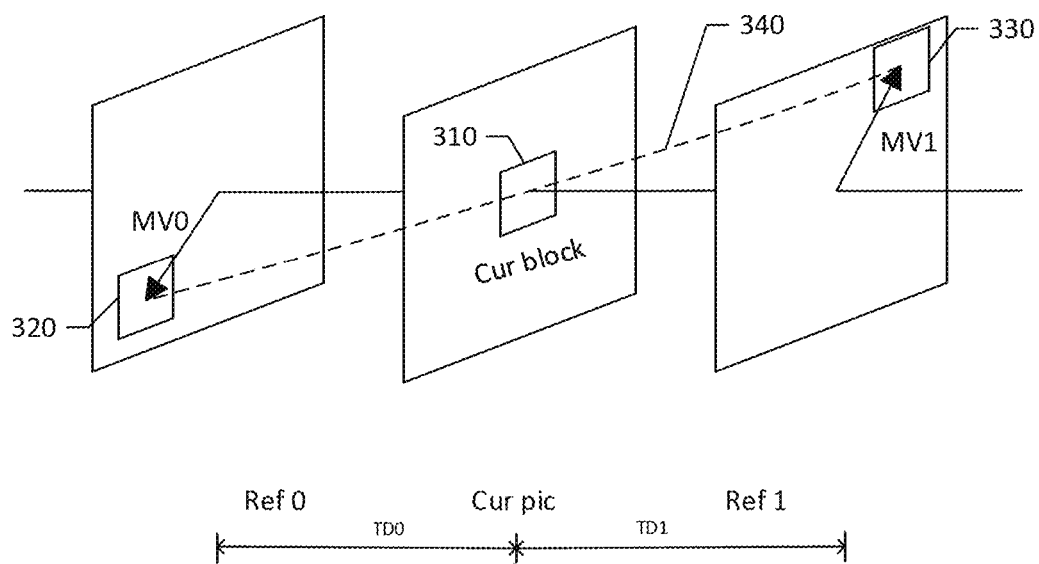
FIG. 3 illustrates an example of applying bilateral matching for a current block in a current picture to search for reference blocks in two equal-distance reference pictures.
Figure 4:
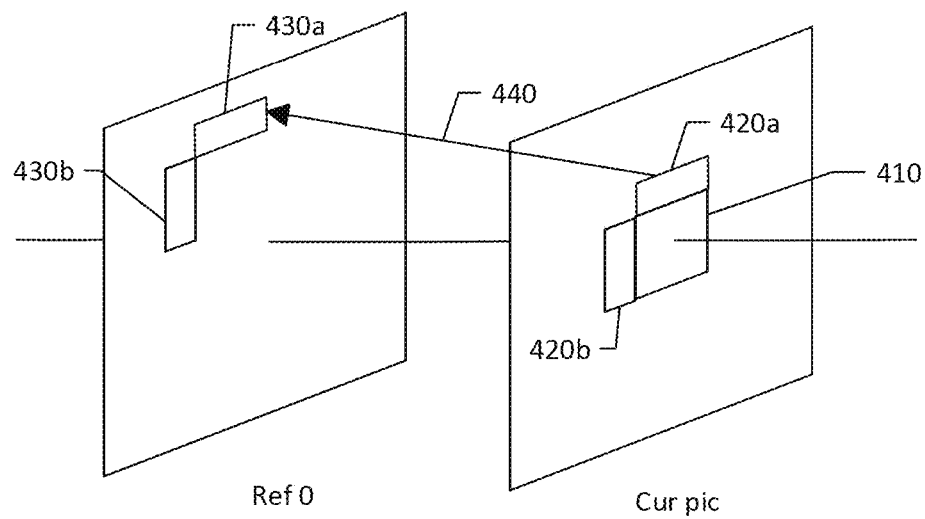
FIG. 4 illustrates an example of applying template matching for a current block in a current picture to search for a MV pointing to a reference block with best matched templates.
Figure 5:
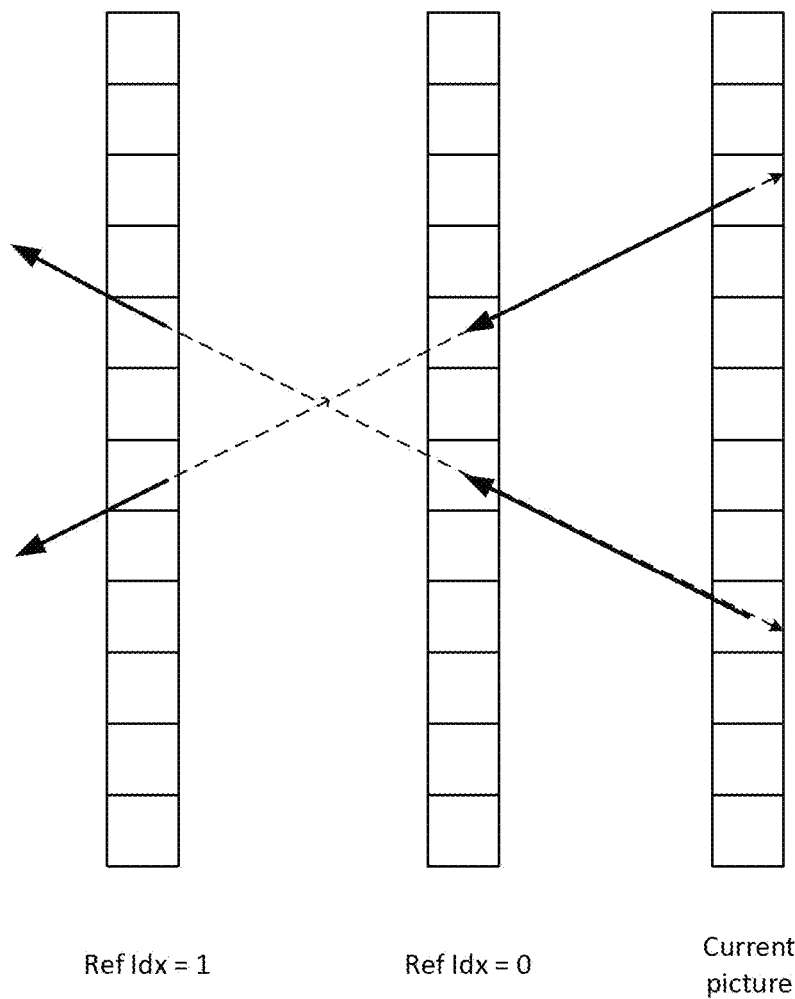
FIG. 5 illustrates the concept of temporal derived MVPs in the pattern-based MV derivation method.
Figure 6:
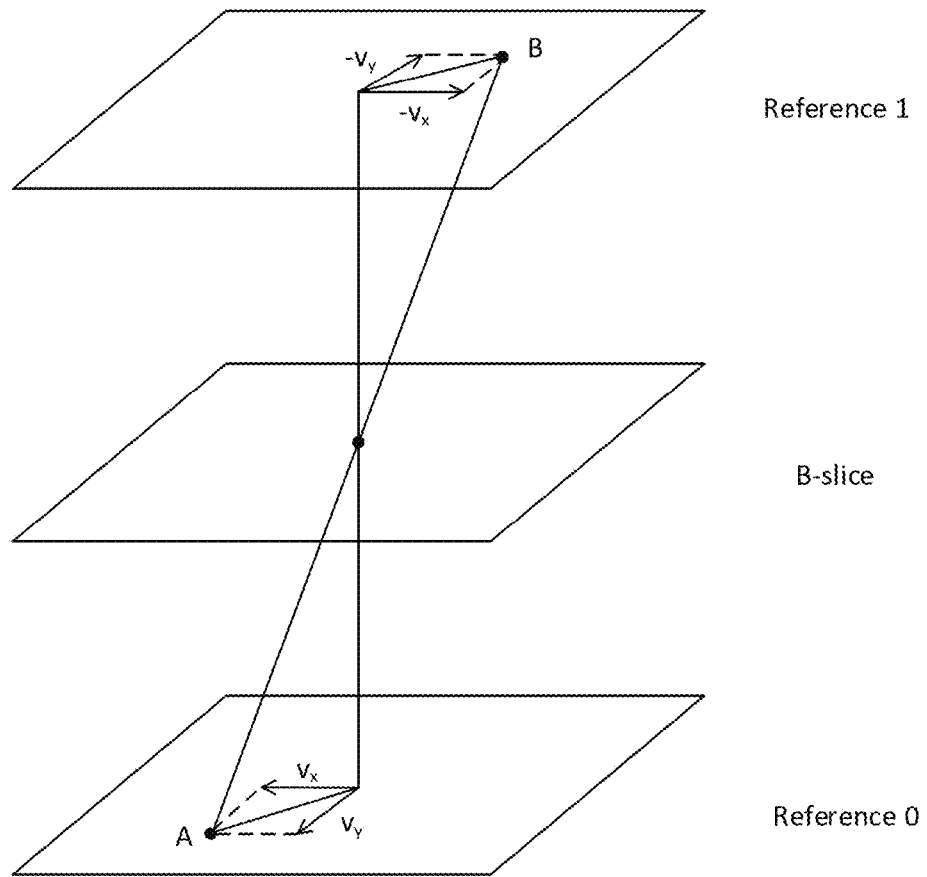
FIG. 6 illustrates an example of applying Bi-Directional Optical Flow (BDOF) for sample refinement.
Figure 7:
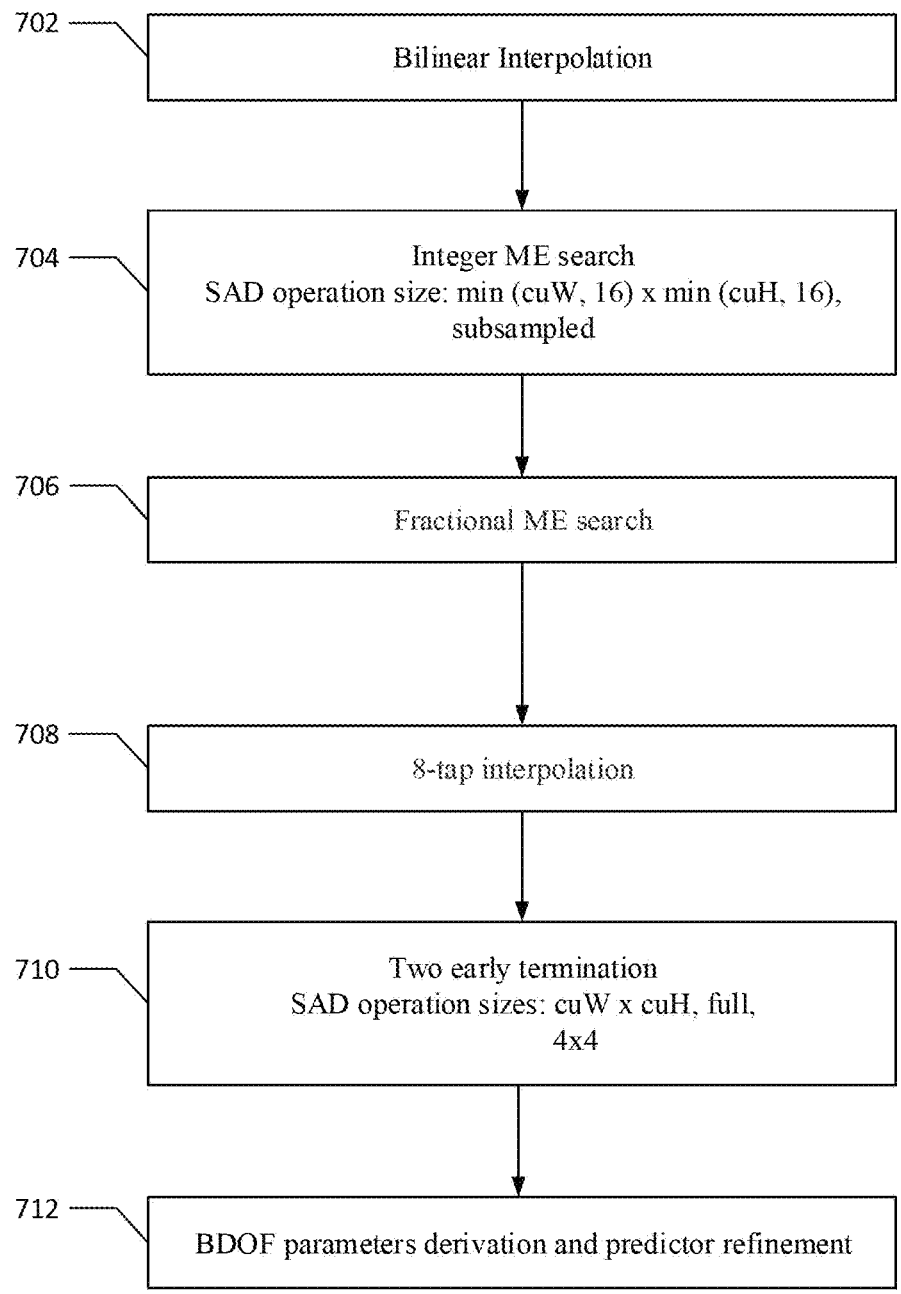
FIG. 7 demonstrates applying both DMVR and BDOF operations to refine reference blocks with different processing units in cost calculation.

FIG. 7 illustrates an exemplary process flow of employing conventional DMVR and BDOF operations in inter prediction for MV refinement. The DMVR operation includes steps 702, 704, and 706 and the BDOF operation includes steps 708, 710, and 712. In step 702, a bilinear interpolation is applied to generate a bilateral template for a current CU coded in bi-direction prediction. In step 704, an integer Motion Estimation (ME) search is performed for each processing unit in the current CU by finding a location with a minimum ME cost for each processing unit. In the example shown in FIG. 7, the ME cost is calculated by a SAD, however, the ME cost may be calculated by other algorithms. The processing unit for performing the integer motion estimation search in step 704 is min(CuW, 16)×min(CuH, 16), where CuW is the width of the current CU and CuH is the height of the current CU. Subsampling is used in the integer motion estimation search in step 704. In step 706, a fractional motion estimation search is performed to find a location of a minimum ME cost. The final location of the minimum ME cost in L0 is assigned to a refined MV of L0 and the final location of the minimum ME cost in L1 is assigned to a refined MV of L1, and reference blocks pointed by the refined MV of L0 and the refined MV of L1 are the final reference blocks of the DMVR operation. In step 708, an 8-tap interpolation filter is applied to the current CU. In step 710, two-level early termination includes first and second early termination processes, where a processing unit for cost calculation in the first early termination process is a CU and a processing unit for cost calculation in the second early termination process is 4×4 samples. The first early termination process is selectively applied to the current CU according to a cost (e.g. SAD) between two predictors of the current CU, and the second early termination process is selectively applied to each 4×4 block in the current CU according to a cost (e.g. SAD) between two predictors of the 4×4 block. Subsampling is not applied to cost calculation in the two early termination processes of BDOF. In step 712, BDOF parameters are derived if the BDOF operation is not terminated in step S710, and predictors are refined according to the BDOF parameters.

Figure 8:
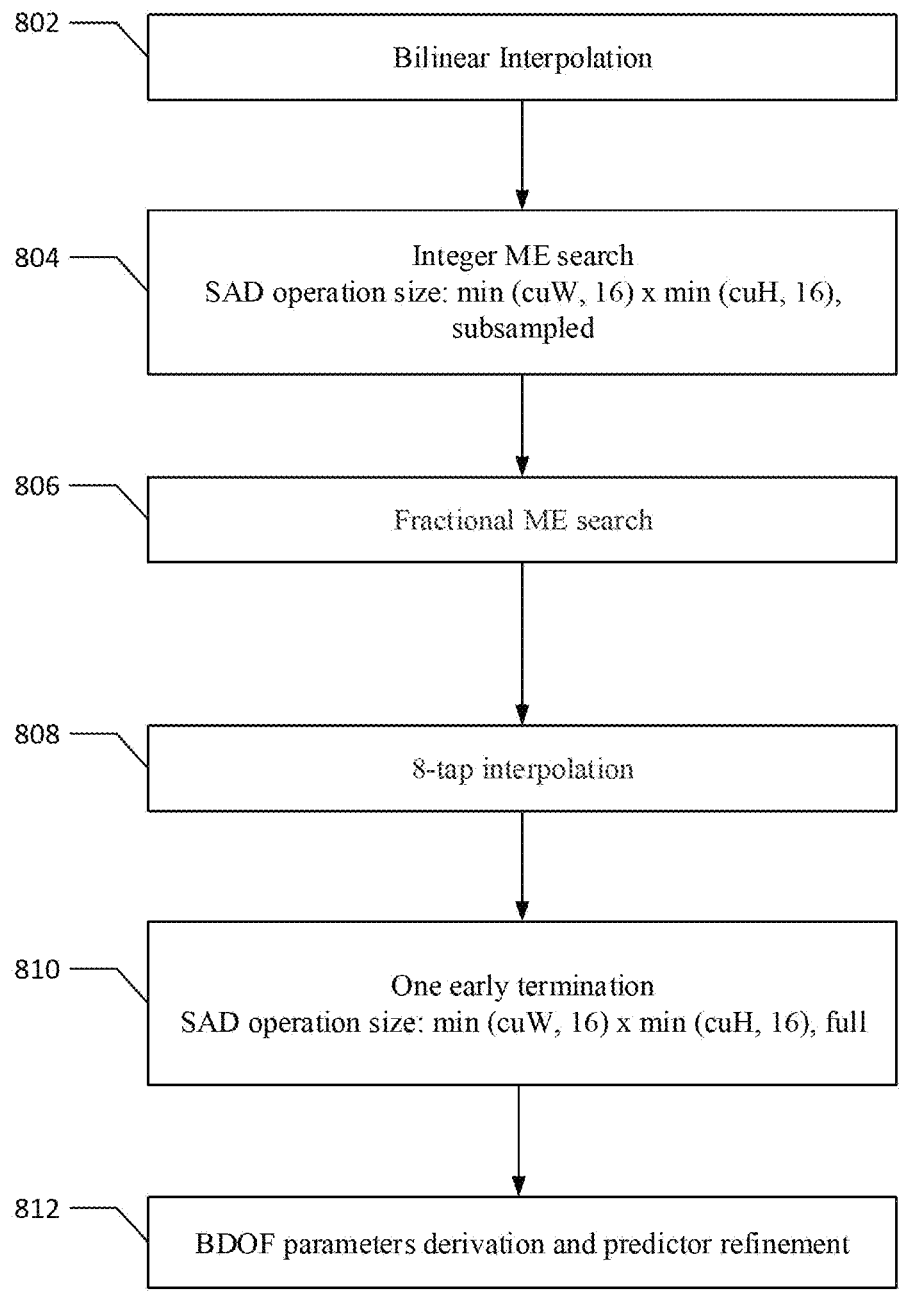
FIG. 8 demonstrates applying both DMVR and BDOF operations to refine reference blocks with unified processing units in cost calculation of the DMVR and BDOF operations according to embodiments of the present invention.

FIG. 8 illustrates an exemplary process flow of employing both DMVR and BDOF operations in inter prediction for MV refinement according to an embodiment of the present invention employing a unified processing unit. The DMVR operation shown in steps 802, 804, and 806 is the same as steps 702, 704, and 706 in FIG. 7. Step 808 of the BDOF operation in FIG. 8 is also the same as step 708 of the BDOF operation in FIG. 7. The two early termination processes in step 710 in FIG. 7 are replaced by one early termination process in step 810 according to this embodiment. The processing unit for calculating costs for deciding whether to early terminate the BDOF operation in step 810 is unified with the processing unit for the integer ME search of the DMVR operation in step 804. For example, the processing unit is equal to a minimum value of CU width (cuW) and 16 multiply by a minimum value of CU height (cuH) and 16. In this embodiment, subsampling is used in the DMVR operation and no subsampling is applied in the BDOF early termination. The BDOF operation is performed by deriving BDOF parameters and refining predictors for the current CU in step 812 when the BDOF operation is not early terminated by step 810.

Figure 9:
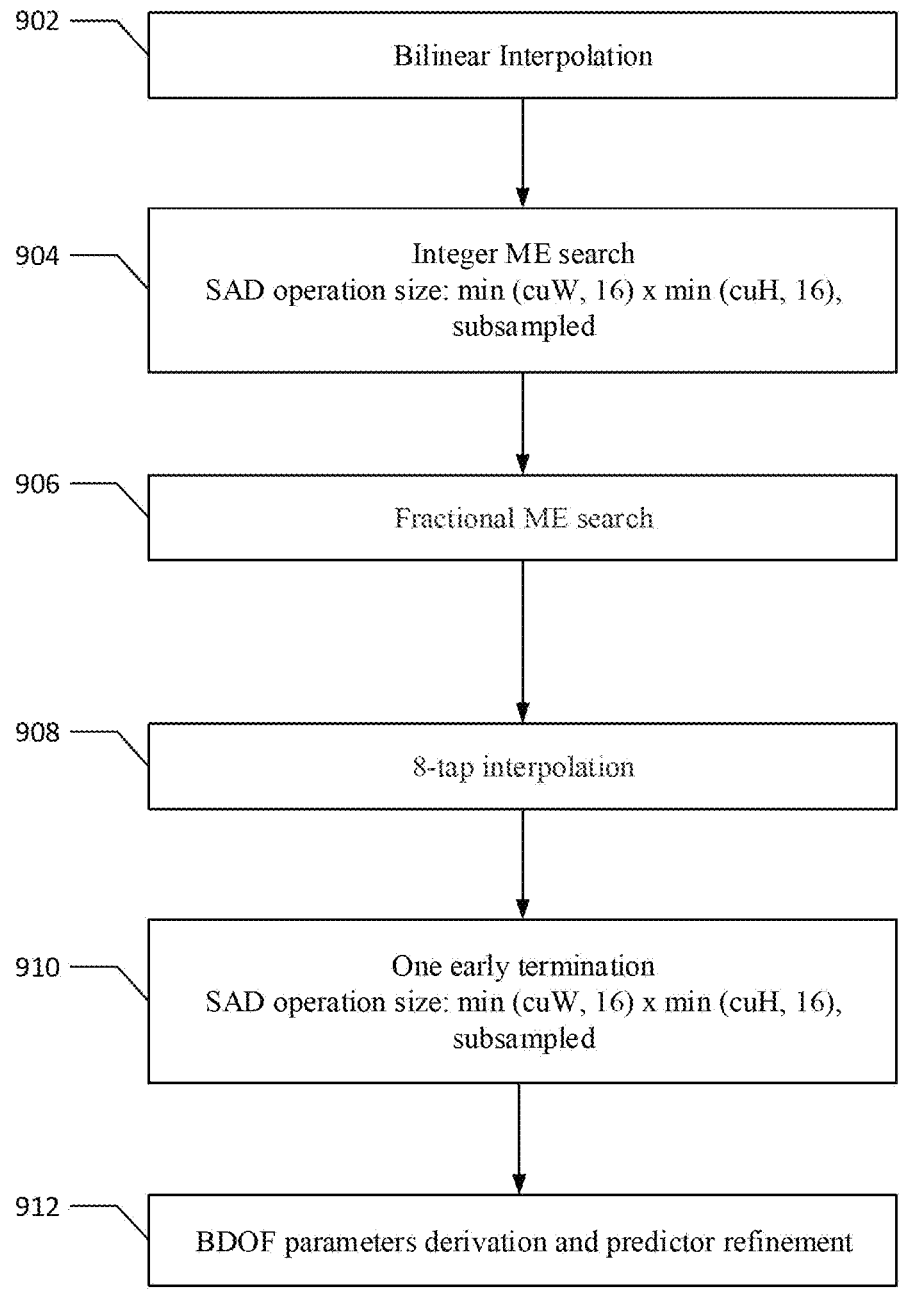
FIG. 9 demonstrates applying both DMVR and BDOF operations to refine reference blocks with unified cost functions in the DMVR and BDOF operations according to embodiments of the present invention.

Unify Cost Function in DMVR and BDOF Early Termination In some embodiments, not only the processing unit for cost calculation in DMVR is the same as the processing unit for cost calculation in the BDOF early termination process, the cost function for the DMVR integer ME search in DMVR is also the same as the cost function for the BDOF early termination process. FIG. 9 illustrates an exemplary process flow of employing both DMVR and BDOF operations in inter prediction for MV refinement according to an embodiment of the present invention employing a unified cost function. All steps in FIG. 9 are the same as corresponding steps in FIG. 8 except step 910. In step 910, the size of the processing unit for calculating a SAD for determining whether the BDOF operation is early terminated is the same as the size of the processing unit for calculating a SAD for DMVR integer ME search. Subsampling is also applied to the BDOF early termination process in step 910, which is unified with the integer ME search in the DMVR operation.

Reuse Cost of DMVR in BDOF Early Termination In some embodiments of the present invention, a same cost function is used in the DMVR operation and the BDOF early termination process, costs calculated in the DMVR operation can be directly reused in the BDOF early termination process. In the DMVR operation, a final motion vector is selected by comparing costs (e.g. SADs) among different candidates. In one embodiment, subsampling by two is utilized when calculating the SAD of one processing unit in both the DMVR operation and the BDOF early termination process. In the BDOF operation, the SAD of one processing unit is required for early termination decision, and since the same cost function is used, the calculated costs for DMVR can be directly used in the BDOF early termination process. When both the DMVR and BDOF operations are applied, the SADs calculated in the DMVR integer ME search process are reused to do early termination in the BDOF operation. When only the BDOF operation is applied, SADs are calculated for the early termination process in the BDOF operation. Since the cost functions for the DMVR operation and the BDOF early termination process are the same, only one threshold is defined. In one embodiment, the cost function in the DMVR operation and the BDOF early termination process may be different, but a mapping function may be used to map from costs calculated in the DMVR operation to costs used in BDOF early termination. The cost calculated for the integer ME search in the DMVR operation may be multiplied by a factor and reused in the BDOF early termination process. For example, subsampling by two is used in the DMVR operation, and no subsampling is applied in the BDOF early termination process. The costs calculated in the DMVR operation is doubled and then used in the BDOF early termination process. In another embodiment, the ratio of the costs for the DMVR operation and the BDOF early termination is dependent on bit-depths of signals in the cost function of the DMVR and BDOF operations. For example, the bit-depth of the signal in the cost function in the DMVR operation is 10 bits because of the bilinear interpolation filter and normalization, whereas the bit-depth of the signal in the BDOF early termination process is 14 bits, so the difference between 10 bits and 14 bits is considered when determining the ratio of the costs.

Figure 10:
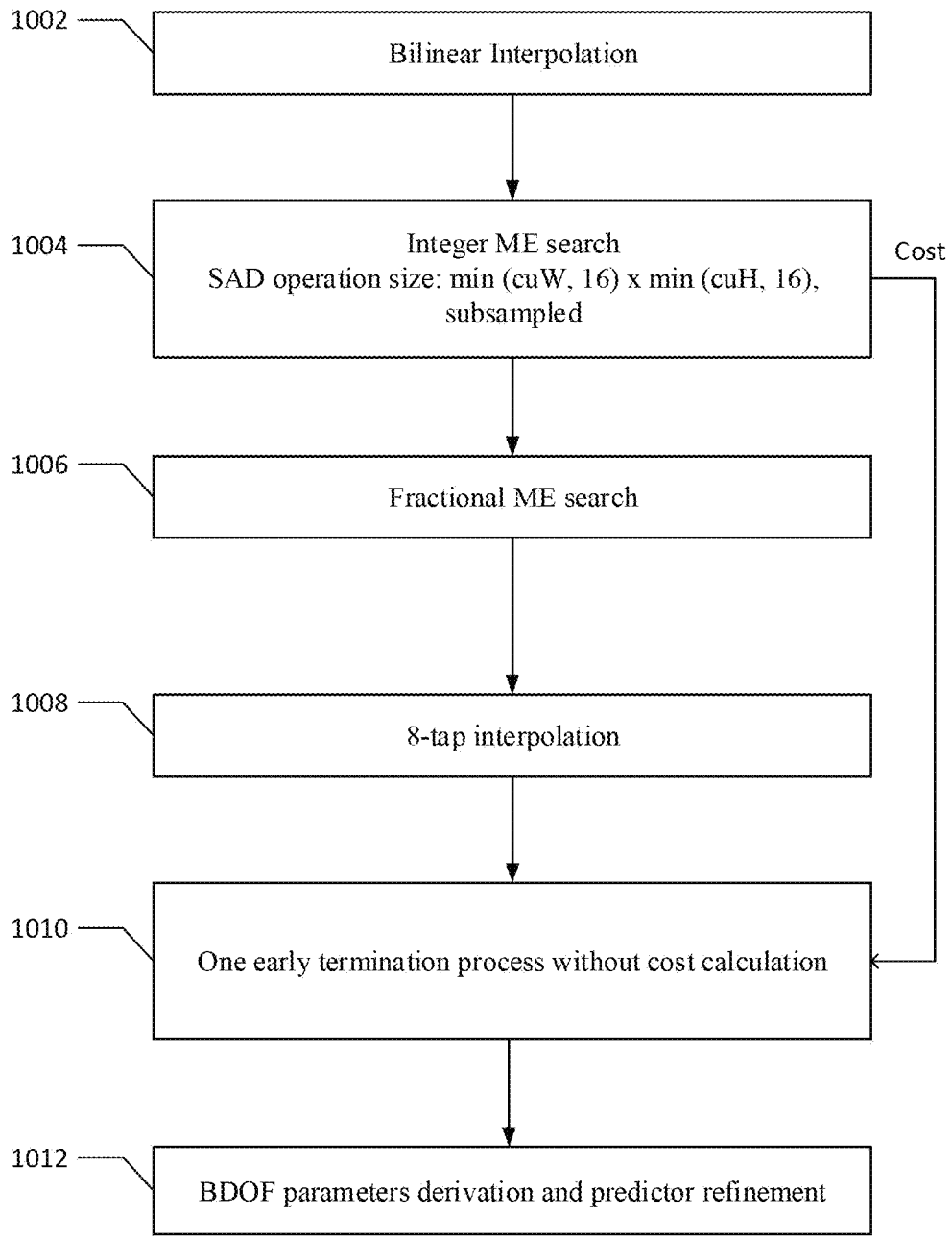
FIG. 10 demonstrates applying both DMVR and BDOF operations to refine reference blocks by reusing costs according to embodiments of the present invention.

FIG. 10 illustrates an exemplary process flow of employing both DMVR and BDOF operations in inter prediction for MV refinement according to an embodiment of the present invention reusing costs calculated in the DMVR operation by the BDOF operation. Steps 1002, 1006, 1008, and 1012 in FIG. 10 are the same as steps 702, 706, 708, and 712 in FIG. 7. Costs calculated for the integer ME search process in the DMVR operation in step 1004 are directly reused by the early termination process in the BDOF operation in step 1010. The computational complexity of the BDOF operation is therefore greatly reduced.

Disable BDOF Operation According to MV Difference Before and After Refinement In order to reduce the computational complexity of enabling DMVR and BDOF, some embodiments of the present invention disables the BDOF operation according to a MV difference before refinement and after refinement. When a MV difference before refinement and after refinement is relatively large, it suggests the change in motion vector by the MV refinement is significant and thus the refined motion vector is not so accurate. In one embodiment, the BDOF operation is disabled when the MV difference before and after refinement is relatively large, because the BDOF operation is used to perform a small refinement based on a trustable motion vector. In one embodiment, when a MV difference before and after refinement is larger than one threshold, the BDOF operation is disabled. Examples of the threshold is one predefined value, or explicitly signaled in the video bitstream at a sequence level, picture level, tile group level, tile level, or block level. If the threshold is predefined, it may be a fixed value or dependent on one or a combination of the CU size, CU shape, search range, temporal distance between two reference pictures, Merge index, video resolution, and profile or level in one coding standard. The MV difference may be one dimension or a sum of two dimensions. For example, the BDOF operation is disabled if at least one of the MV differences in the horizontal direction and vertical direction is larger than a threshold. In another example, the BDOF operation is disabled if a sum of MV differences in the horizontal direction and vertical direction is greater than one threshold. In some embodiments, the BDOF operation is disabled when a MV difference before refinement and after refinement is smaller than one threshold. In one embodiment, the BDOF operation is disabled when a MV difference before refinement and after refinement is either larger than a first threshold or smaller than a second threshold.

Disable Fractional Motion Refinement According to MV Difference Before and After Refinement Some embodiments of the present invention adaptively disable fractional motion refinement of DMVR according to a MV difference before integer motion refinement and after integer motion refinement to reduce the computational complexity of enabling both DMVR and BDOF. A small MV difference before refinement and after refinement of the integer motion estimation search indicates the change in motion is minor; in this case, an embodiment skips fractional motion refinement of DMVR as the refinement performed by the BDOF operation is sufficient. A MV difference before and after refinement is judged as small or large by comparing with a threshold, and the threshold is a predefined value according to one embodiment, or the threshold is explicitly signaled in the video bitstream at a sequence level, picture level, tile group level, tile level, or block level. In cases when the threshold is predefined, it is a fixed value or it is depending on one or a combination of the CU size, CU shape, search range, temporal distance between two reference pictures, Merge index, video resolution, and profile or level in one coding standard. The MV difference corresponds to one dimension or a sum of two dimensions according to various embodiments. For example, if one of the MV differences in the horizontal direction and vertical direction is smaller than one threshold, fractional motion refinement of DMVR is disabled. In another example, if a sum of the MV differences in the horizontal direction and vertical direction is smaller than one threshold, fractional motion refinement in DMVR is disabled. In some other embodiments, fractional motion refinement in the DMVR operation is disabled when a MV difference before refinement and after refinement of the integer motion estimation search is larger than a threshold. In one embodiment, fractional motion refinement in the DMVR operation is disabled when a MV difference before integer motion refinement and after integer motion refinement is either larger than a first threshold or smaller than a second threshold.

Figure 11:
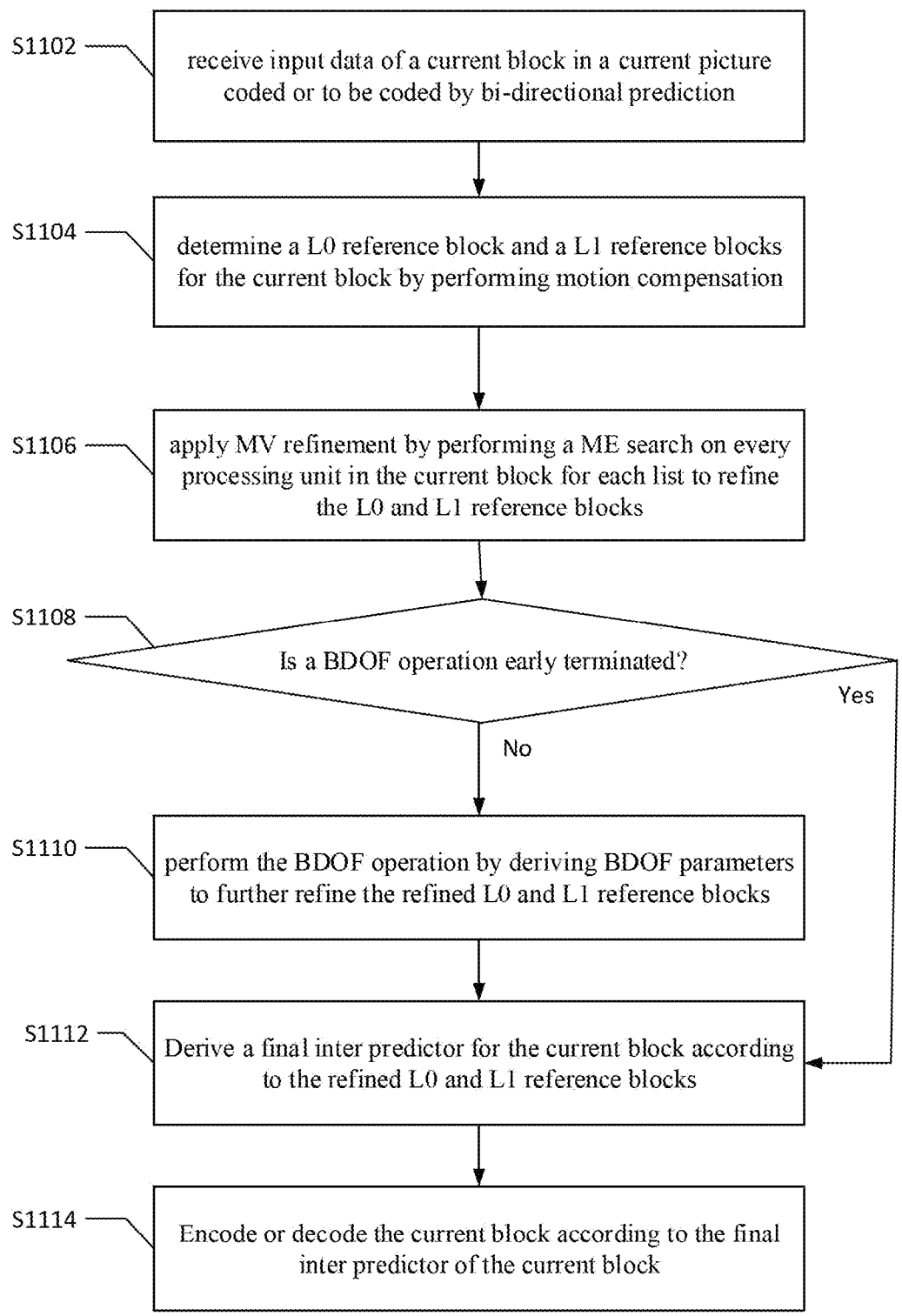
FIG. 11 is a flowchart shows an exemplary embodiment of the present invention for processing a current block by bi-directional prediction.

Representative Flowchart of Exemplary Embodiments FIG. 11 shows a flowchart illustrating a video processing method encoding or decoding a current block by bi-directional prediction according to exemplary embodiments of the present invention. A video encoding system or a video decoding system receives input data associated with a current block coded or to be coded in bi-directional prediction in step S1102. In step S1104, List 0 and List 1 reference blocks for the current block are determined by performing motion compensation from a reference picture in List 0 and a reference picture in List 1 respectively. A decoder motion vector refinement operation is performed to refine the List 0 and List 1 reference blocks in step S1106 by a motion estimation search. The motion estimation search of the decoder motion vector refinement operation is performed on each processing unit in the current block. The motion estimation search may include an integer motion estimation search and a fractional motion estimation search. In step S1108, the video encoding or decoding system determines if a Bi-Directional Optical Flow (BDOF) operation is early terminated according to a cost of the refined List 0 and List 1 reference blocks of each processing unit in the current block. The processing unit operated for cost calculation in BDOF early termination in step S1108 is aligned with the processing unit operated for cost calculation in the decoder motion vector refinement operation in step S1106. The BDOF operation is skipped if the video encoding or decoding system determines the BDOF operation is early terminated in step S1108. The video encoding or decoding system performs the BDOF operation by deriving BDOF parameters to further refine the refined List 0 and List 1 reference blocks in step S1110 if the BDOF operation is not early terminated in step S1108. The BDOF operation derives sample-based refinement through optical flow. A final inter predictor for the current block is derived according to the refined List 0 and List 1 reference blocks in step S1112. The video encoding or decoding system encodes or decodes the current block according to the final inter predictor of the current block in step S1114. In one embodiment, the cost functions used in the decoder motion vector refinement operation and BDOF early termination are further unified. In some embodiments, costs calculated in the motion estimation search of the decoder motion vector refinement operation are reused for determining whether the BDOF operation is early terminated. The encoding or decoding system may derive a motion vector difference before and after refinement to adaptively disable the BDOF operation step S1110 or the fractional motion estimation search in the decoder motion vector refinement operation in step S1106 according to some embodiments.

Video Encoder and Decoder Implementations The foregoing proposed video coding methods can be implemented in video encoders or decoders. For example, a proposed video processing method is implemented in a predictor derivation module of an encoder, and/or predictor derivation module of a decoder. In another example, a proposed video processing method is implemented in a motion compensation module of an encoder, and/or a motion compensation module of a decoder. Alternatively, any of the proposed methods can be implemented as a circuit coupled to the predictor derivation or motion compensation module of the encoder and/or the predictor derivation module or motion compensation module of the decoder, so as to provide the information needed by the predictor derivation module or the motion compensation module.

FIG. 12 illustrates an exemplary system block diagram for a Video Encoder 1200 implementing various embodiments of the present invention. Intra Prediction module 1210 provides intra predictors based on reconstructed video data of a current picture. Inter Prediction module 1212 performs Motion Estimation (ME) and Motion Compensation (MC) to provide inter predictors based on video data from other picture or pictures. To encode a current block by bi-directional prediction according to some embodiments of the present invention, Inter Prediction module 1212 first determines a List 0 reference block by performing motion estimation and motion compensation from a List 0 reference picture and a List 1 reference block by performing motion estimation and motion compensation from a List 1 reference picture. The List 0 and List 1 reference blocks are refined by a motion estimation search of motion vector refinement by finding a location corresponding to a minimum motion estimation cost around the List 0 and List 1 reference blocks. The cost calculation in the motion estimation search is performed on each processing unit in the current block. Before performing a BDOF operation to further refine the List 0 and List 1 reference blocks, a cost of the refined List 0 and List 1 reference blocks of each processing unit in the current block is used to determine if the BDOF operation is early terminated. The processing unit operated for cost calculation in BDOF early termination is aligned with the processing unit operated for cost calculation in the motion estimation search of motion vector refinement. In some embodiments, costs calculated in motion vector refinement are reused to determine whether the BDOF operation is early terminated. The BDOF operation is adaptively applied to derive sample-based refinement through optical flow if the BDOF operation is not early terminated. The Inter Prediction module 1212 derives a final inter predictor for the current block according to the refined List 0 and List 1 reference blocks.

Either Intra Prediction module 1210 or Inter Prediction module 1212 supplies the selected predictor to Adder 1216 to form prediction errors, also called prediction residual. The prediction residual of the current block are further processed by Transformation module (T) 1218 followed by Quantization module (Q) 1220. The transformed and quantized residual signal is then encoded by Entropy Encoder 1232 to form a video bitstream. Motion information of the final inter predictor of the current block are also encoded by Entropy Encoder 1232. The video bitstream is then packed with side information. The transformed and quantized residual signal of the current block is processed by Inverse Quantization module (IQ) 1222 and Inverse Transformation module (IT) 1224 to recover the prediction residual. As shown in FIG. 12, the prediction residual is recovered by adding back to the selected predictor at Reconstruction module (REC) 1226 to produce reconstructed video data. The reconstructed video data may be stored in Reference Picture Buffer (Ref. Pict. Buffer) 1230 and used for prediction of other pictures. The reconstructed video data recovered from REC 1226 may be subject to various impairments due to encoding processing; consequently, In-loop Processing Filter 1228 is applied to the reconstructed video data before storing in the Reference Picture Buffer 1230 to further enhance picture quality.

A corresponding Video Decoder 1300 for decoding the video bitstream generated from the Video Encoder 1200 of FIG. 12 is shown in FIG. 13. The video bitstream is the input to Video Decoder 1300 and is decoded by Entropy Decoder 1310 to parse and recover the transformed and quantized residual signal and other system information. The decoding process of Decoder 1300 is similar to the reconstruction loop at Encoder 1200, except Decoder 1300 only requires motion compensation prediction in Inter Prediction module 1314. Each block is decoded by either Intra Prediction module 1312 or Inter Prediction module 1314. Switch 1316 selects an intra predictor from Intra Prediction module 1312 or an inter predictor from Inter Prediction 1314 according to decoded mode information. To decode a current block coded in bi-directional prediction, Inter Prediction module 1314 determines a List 0 reference block by performing motion compensation from a List 0 reference picture and determines a List 1 reference block by performing motion compensation from a List 1 reference picture. Inter Prediction module 1314 performs a motion vector refinement using a motion estimation search to refine the List 0 and List 1 reference blocks by finding a location with a minimum motion estimation cost around the List 0 and List 1 reference blocks. Cost calculation in the motion estimation search of the motion vector refinement is performed on each processing unit in the current block. A Bi-Directional Optical Flow (BDOF) operation is early terminated according to a cost of the refined List 0 and List 1 reference blocks of each processing unit, where the processing unit operated for cost calculation in BDOF early termination is aligned with the processing unit operated for cost calculation in the motion vector refinement. The BDOF operation is skipped or performed on a processing unit according to the cost of the processing unit, and the cost may be derived or inherited from a cost calculated for the motion vector refinement. In some embodiments, the cost function used in the motion vector refinement is unified with the cost function used in BDOF early termination. In some embodiments, costs calculated in the motion vector refinement are reused for determining BDOF early termination. A final inter predictor for the current block is derived according to the refined List 0 and List 1 reference blocks. The transformed and quantized residual signal associated with the current block is recovered by Inverse Quantization module (IQ) 1320 and Inverse Transformation module (IT) 1322. The recovered residual signal of the current block is reconstructed by adding back the final inter predictor in Reconstruction module (REC) 1318 to produce reconstructed video. The reconstructed video is further processed by In-loop Processing Filter (Filter) 1324 to generate final decoded video. If the currently decoded picture is a reference picture for later pictures in decoding order, the reconstructed video of the currently decoded picture is also stored in Ref. Pict. Buffer 1326.

Various components of Video Encoder 1200 and Video Decoder 1300 in FIG. 12 and FIG. 13 may be implemented by hardware components, one or more processors configured to execute program instructions stored in a memory, or a combination of hardware and processor. For example, a processor executes program instructions to control receiving of input data associated with a current block in a current picture. The processor is equipped with a single or multiple processing cores. In some examples, the processor executes program instructions to perform functions in some components in Encoder 1200 and Decoder 1300, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 12 and 13, Encoder 1200 and Decoder 1300 may be implemented in the same electronic device, so various functional components of Encoder 1200 and Decoder 1300 may be shared or reused if implemented in the same electronic device.

Embodiments of the video processing method for encoding or decoding bi-directional predicted blocks with motion refinement may be implemented in a circuit integrated into a video compression chip or program codes integrated into video compression software to perform the processing described above. For examples, BDOF early termination may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data by bi-directional prediction in a video coding system, comprising:
    receiving input data associated with a current block coded or to be coded by bi-directional prediction in a current picture;
    determining a List 0 reference block for the current block by performing motion compensation from a reference picture in List 0 and determining a List 1 reference block for the current block by performing motion compensation from a reference picture in List 1;
    performing a motion vector refinement using a motion estimation search to refine the List 0 and List 1 reference blocks by finding a location corresponding to a minimum motion estimation cost around the List 0 reference block and a location corresponding to a minimum motion estimation cost around the List 1 reference block, wherein cost calculation for finding the minimum most estimation costs in the motion vector refinement is performed on each processing unit in the current block;
    determining whether a Bi-Directional Optical Flow (BDOF) operation is early terminated according to a cost of the refined List 0 and List 1 reference blocks of each processing unit in the current block, wherein the processing unit for BDOF early termination is aligned with the processing unit for the motion vector refinement;
    skipping the BDOF operation if the BDOF operation is early terminated and deriving a final inter predictor for the current block according to the refined List 0 and List 1 reference blocks, or performing the BDOF operation by deriving BDOF parameters to further derive the inter predictor for the current block according to the refined List 0 and List 1 reference blocks if the BDOF operation is not early terminated, wherein the BDOF operation derives sample-based refinement through optical flow;
    and
    encoding or decoding the current block according to the final inter predictor of the current block.

2. The method of claim 1, wherein the cost for determining whether to early terminate the BDOF operation is calculated by a Sum of Absolute Differences (SAD).

3. The method of claim 1, wherein a size of the current block is M×N samples and a size of the processing units for cost calculation in the motion vector refinement and BDOF early termination is a product of a minimum value between M and 16 and a minimum value between N and 16.

4. The method of claim 1, further comprising performing a second early termination process of BDOF on each 4×4 block in a processing unit if the BDOF operation is not early terminated according to the cost of the processing unit, wherein the second early termination process of BDOF determines whether to terminate the BDOF operation for each 4×4 block according to a cost between two predictors of each 4×4 block.

5. The method of claim 1, wherein subsampling is used in the motion vector refinement, and subsampling is not applied to cost calculation for determining whether to early terminate the BDOF operation, wherein the minimum motion estimation costs calculated in the motion vector refinement are multiplied by a factor and used to determine whether the BDOF operation is early terminated.

6. The method of claim 1, wherein the minimum motion estimation costs calculated in the motion vector refinement are directly reused to determine whether the BDOF operation is early terminated.

7. The method of claim 1, wherein the minimum motion estimation costs calculated in the motion vector refinement are used to derive costs for determining whether the BDOF operation is early terminated according to a ratio, and the ratio is dependent on bit-depths of signals in cost functions in the motion vector refinement and the BDOF operation.

8. An apparatus of processing video data by bi-directional prediction in a video coding system, the apparatus comprising one or more electronic circuits configured for:
    receiving input data associated with a current block coded or to be coded by bi-directional prediction in a current picture;
    determining a List 0 reference block for the current block by performing motion compensation from a reference picture in List 0 and determining a List 1 reference block for the current block by performing motion compensation from a reference picture in List 1;
    performing a motion vector refinement using a motion estimation search to refine the List 0 and List 1 reference blocks by finding a location corresponding to a minimum motion estimation cost around the List 0 reference block and a location corresponding to a minimum motion estimation cost around the List 1 reference block, wherein cost calculation for finding the minimum most estimation costs in the motion vector refinement is performed on each processing unit in the current block;

determining whether a Bi-Directional Optical Flow (BDOF) operation is early terminated according to a cost of the refined List 0 and List 1 reference blocks of each processing unit in the current block, wherein the processing unit for BDOF early termination is aligned with the processing unit for the motion vector refinement;

skipping the BDOF operation if the BDOF operation is early terminated and deriving a final inter predictor for the current block according to the refined List 0 and List 1 reference blocks, or performing the BDOF operation by deriving BDOF parameters to further derive the final inter predictor for the current block according to the refined List 0 and List 1 reference blocks if the BDOF operation is not early terminated, wherein the BDOF operation derives sample-based refinement through optical flow;

and encoding or decoding the current block according to the final inter predictor of the current block.

9. A non-transitory computer readable medium storing program instruction causing a processing circuit of an apparatus to perform a bi-directional prediction processing method for video data, and the method comprising:

receiving input data associated with a current block coded or to be coded by bi-directional prediction in a current picture;

determining a List 0 reference block for the current block by performing motion compensation from a reference picture in List 0 and determining a List 1 reference block for the current block by performing motion compensation from a reference picture in List 1;

performing a motion vector refinement using a motion estimation search to refine the List 0 and List 1 reference blocks by finding a location corresponding to a minimum motion estimation cost around the List 0 reference block and a location corresponding to a minimum motion estimation cost around the List 1 reference block, wherein cost calculation for finding the minimum most estimation costs in the motion vector refinement is performed on each processing unit in the current block;

determining whether a Bi-Directional Optical Flow (BDOF) operation is early terminated according to a cost of the refined List 0 and List 1 reference blocks of each processing unit in the current block, wherein the processing unit for BDOF early termination is aligned with the processing unit for the motion vector refinement;

skipping the BDOF operation if the BDOF operation is early terminated and deriving a final inter predictor for the current block according to the refined List 0 and List 1 reference blocks, or performing the BDOF operation by deriving BDOF parameters to further derive the final inter predictor for the current block according to the refined List 0 and List 1 reference blocks if the BDOF operation is not early terminated, wherein the BDOF operation derives sample-based refinement through optical flow;

and encoding or decoding the current block according to the final inter predictor of the current block.

* * * * *